A. S. MACHEN.

ADVERTISING CABINET.

APPLICATION FILED JUNE 16, 1916.

Reissued Apr. 17, 1917.

14,285.

2 SHEETS—SHEET 1.

Inventor
Albert S. Machen

A. Cullman
Attorney

THE NORRIS PETERS CO., PHOTO-LITHO., WASHINGTON, D. C.

A. S. MACHEN.

ADVERTISING CABINET.

APPLICATION FILED JUNE 16, 1916.

Reissued Apr. 17, 1917.

14,285.

2 SHEETS—SHEET 2.

Inventor
Albert S. Machen

Attorney

THE NORRIS PETERS CO., PHOTO-LITHO., WASHINGTON, D. C.

UNITED STATES PATENT OFFICE.

ALBERT S. MACHEN, OF HICKS WHARF, VIRGINIA, ASSIGNOR, BY MESNE ASSIGNMENTS, TO THE NATIONAL CASH REGISTER CO., OF DAYTON, OHIO, A CORPORATION OF OHIO.

ADVERTISING-CABINET.

14,285. Specification of Reissued Letters Patent. Reissued Apr. 17, 1917.

Original No. 1,137,072, dated April 27, 1915, Serial No. 804,548, filed December 3, 1913. Application for reissue filed June 16, 1916. Serial No. 104,117.

*To all whom it may concern:*

Be it known that I, ALBERT S. MACHEN, a citizen of the United States, and resident of Hicks Wharf, in the county of Mathews, State of Virginia, have invented certain new and useful Improvements in Advertising-Cabinets, of which I declare the following to be a full, clear, and exact description.

The invention has relation to contrivances embodying a plurality of card supporting frames adapted to bear on their sides the matter to be displayed, the purpose being to expose advertising or other matter upon turning the frames from one position to another.

The invention provides a device embodying two sets of frames, one set being arranged in advance of the other and mounted to turn from an upright into approximately a horizontal position and vice versa and the frames of the second set being mounted to slide vertically, the sets of frames being connected to move in synchronism.

The invention consists of the novel features, details of construction and combination of parts, which hereinafter will be more particularly set forth, illustrated in the accompanying drawings, and pointed out in the appended claims.

Figure 1:
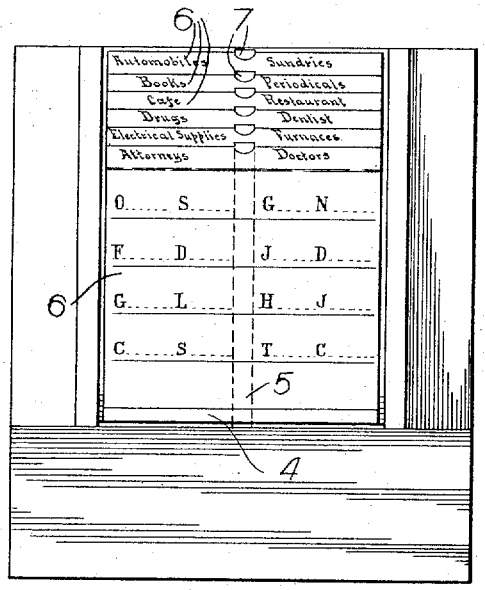
Figure 2:
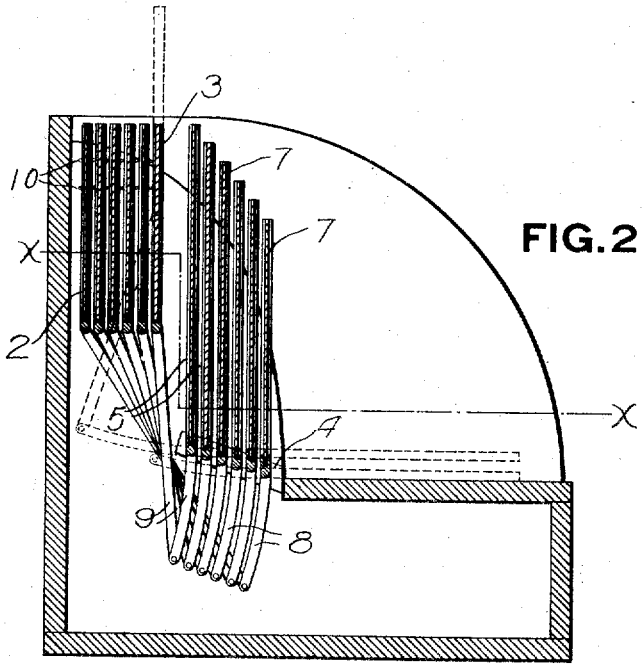
Figure 3:
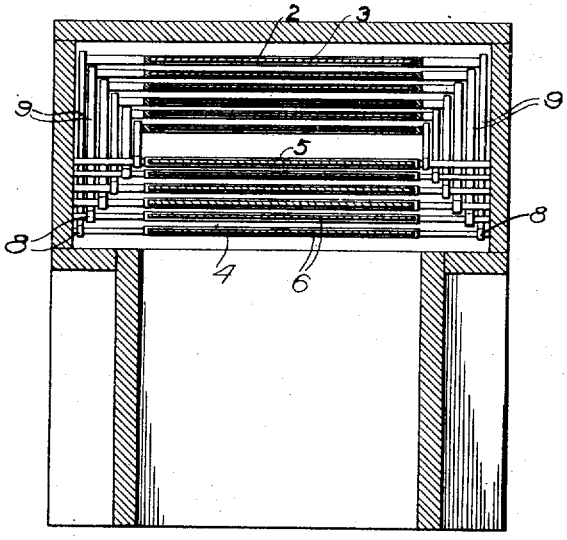
Figure 4:
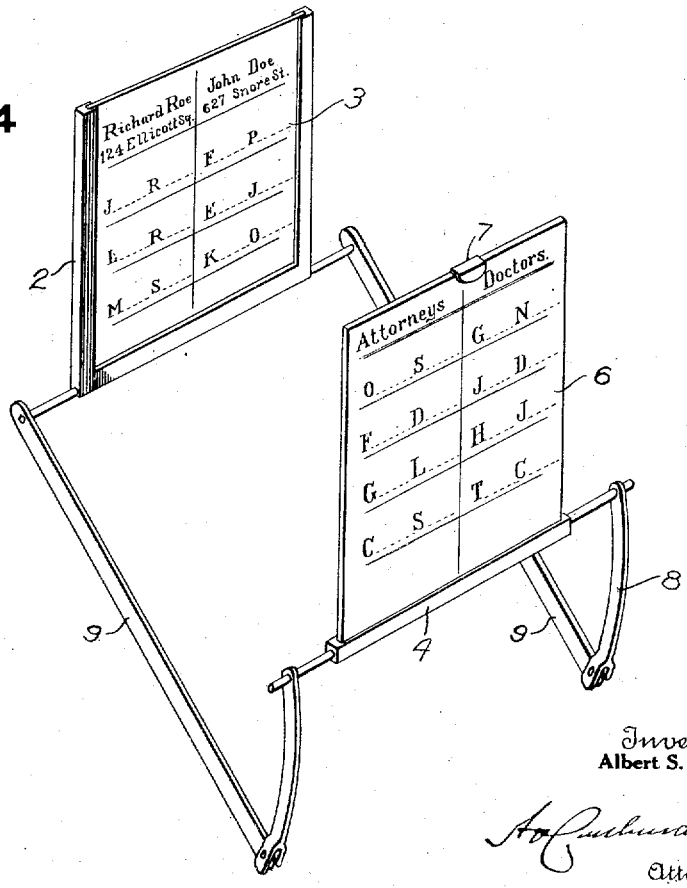

Referring to the drawings forming a part of the specification, Figure 1 is a front view of a device embodying the invention. Fig. 2 is a vertical longitudinal section, the dotted lines showing frames of the front set lowered and a frame of the rear set elevated. Fig. 3 is a horizontal section. Fig. 4 is a perspective view showing frames of the front and rear sets and the intermediate connecting means.

Corresponding and like parts are referred to in the following description, and indicated in all the views of the drawings by the same reference characters.

In order that the cards may be interchangeable or made replaceable suitable holders or frames are employed for their reception.

It is understood that the frames, their mounts and component parts are mounted in a suitable casing which forms a housing therefor, said casing being of any desired finish to present a neat and attractive appearance. In order to designate the two sets of frames the same will be referred to hereinafter by the terms "front" and "rear," corresponding frames of such sets being connected in a manner to move in synchronism, the one having a sliding movement and the other a pivotal movement. The frames of the two sets are arranged the one in front of the other, each being provided with advertising or other matter which may be imprinted upon both sides if desired.

The rear set of frames are mounted to slide vertically whereas the front set of frames are pivotally mounted to turn from an upright into a horizontal position and vice versa. Each of the rear frames is designated by the reference numeral 2 and consists of an approximately U-shaped frame, the bars having their inner sides grooved to receive the card 3.

Each of the front holders is approximately of inverted T-form and comprises a horizontal bar 4 and a vertical bar 5.

The upper side of the horizontal bar 4 is grooved to receive the lower edge of the front card 6. The upper end of the vertical bar 5 is bent to provide a clip 7 which engages over the top edge of the card 6 and grips the same with sufficient pressure to retain the card in proper position. The front frame is pivoted in line with the horizontal bar 4. Arms 8 project rearwardly from the ends of the horizontal bars 4 and links 9 connect the rear ends of such arms with the rear frames 2, the relative arrangement and proportions of the parts being such as to insure ample vertical movement of the rear frames upon imparting pivotal movement to the front frames whereby the front frames are turned to occupy a horizontal position the corresponding rear frames are elevated sufficiently to expose the matter appearing thereon. The rear frames are somewhat heavier than the front frames to provide a counter-balance for automatically returning the front frames to normal or vertical position when released after being turned into a horizontal position so that under normal conditions the two sets of frames will appear in upright position.

Projections 10 between the leaves of the rear set serve to guide the latter in their vertical movements.

In accordance with the invention it is essential that each set of frames contain a like number, corresponding frames of the two sets being connected for synchronism of movement, the one pivotally, the other rectilinearly. When a card 6 of the front set of frames is turned from upright into horizontal position, the corresponding card 3 of the rear set of frames 2 is caused to slide vertically. When the front frame is released it is automatically returned to normal position by the superior weight of the rear frame.

It will be noted that when any of the inner frames of the front group is turned down, all of the frames located in front of it will also be turned down, and the frames in the rear group corresponding to those turned down in the front group will be raised. Upon examination of Figs. 1 and 2 it will be seen that the frames comprising the front group are arranged in stepped relation so that the titles on the upper marginal edges of the cards will be exposed; also, to permit the various frames to be more conveniently grasped by the hand when it is desired to turn the frames down.

It is obvious that while the invention is shown in the drawings as employed for the classification of advertising matter it is capable of use for the classified filing of data of other nature where it is desirable and of advantage to have the data filed in further classification such as the provision of the two sets of frames movable in synchronism will afford.

It is to be understood that the form of the device shown in the drawings and described herein is merely illustrative, and that the invention may be embodied in many other forms. Also, the words used herein for directions and kinds of movement, like "front," "rear", "sliding," "pivoted" are descriptive only, and other directions and kinds of movement are considered to be within the invention, and within the scope of the claims.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

What is claimed is:

1. In an appliance of the character specified, the combination of two groups of vertically arranged frames of like number, the said groups being adapted to removably support corresponding sets of cards, and connecting means between corresponding frames of the two groups, whereby movement of any one of the frames of one group, produces movement of the corresponding frame of the opposite group, so that the corresponding cards of the two sets are exposed.

2. In an appliance of the character specified, a support, front and rear groups of frames therein adapted to support corresponding sets of cards, the frames forming the front group, being pivotally located for rocking movement, and arranged in stepped relation so as to expose the upper marginal edges of the adjacent cards, connecting means between corresponding frames of front and rear groups, whereby movement of any one of the frames of the front group produces movement of the corresponding frame of the rear group.

3. In an appliance of the character specified, the combination of two groups of frames, the said frames being adapted removably to support corresponding data, and connecting links between corresponding frames of the two groups, whereby movement of any of the frames of one group, produces movement of the corresponding frames of the other group, so that a corresponding frame of each of the two groups is exposed.

4. In an appliance of the character specified, the combination of two groups of frames adapted removably to support data, and each frame of one group having a companion frame in the other group adapted to carry corresponding data, pivotal supports for one group to permit movement of the frames of that group to expose any data supported thereby, and link connections between the companion frames of the two groups whereby movement of frames of one group will effect simultaneous movement of the companion frames of the other group to expose the corresponding data.

5. In an appliance of the character specified, the combination of two groups of frames adapted removably to support data and each frame of one group having a companion frame in the other group adapted to carry corresponding data, pivotal supports for one group to permit movement of the frames of that group to expose any data supported thereby, said pivotal supports being arranged in a plane extending rearwardly and upwardly to cause a stepped relation of the upper edges of the frames so as to expose the upper portions of the frames, and link connections between the companion frames of the two groups whereby movement of the frames of one group will effect simultaneous movement of the companion frames of the other group to expose corresponding data.

6. In an appliance of the character specified, the combination of two groups of frames, the said frames being adapted removably to support corresponding data, connecting means between corresponding frames of the two groups, whereby movement of any of the frames of one group produces movement of the corresponding frame of the other group so that a corresponding frame of each of the two groups is exposed, the frames of the latter group being heavier than the frames of the first group so as to restore all of said frames to normal position when released.

7. In an appliance of the character specified, the combination of two groups of frames adapted removably to support data, and each frame of one group having a companion frame in the other group adapted to carry corresponding data, pivotal supports for one group to permit movement of the frames of that group to expose any data supported thereby, link connections between the companion frames of the two groups whereby movement of frames of one group will effect simultaneous movement of the companion frames of the other group to expose the corresponding data, the frames of the latter group being heavier than the frames of the first group so as to restore all of the moved frames to normal position when released.

8. In an appliance of the character specified, the combination of two groups of frames adapted removably to support data, and each frame of one group having a companion frame in the other group adapted to carry corresponding data, the frames of one group being vertically slidable, projections for controlling the vertical movement of said slidable frames, pivotal supports for the frames of the other group and connections between the companion frames of the two groups whereby movement of frames of one group will effect movement of the corresponding frames of the other group.

9. In an appliance of the character specified, the combination of two groups of frames adapted removably to support data and each frame of one group having a companion frame in the other group adapted to carry corresponding data, grooved bars forming part of the frames of one group and adapted to removably receive in said grooves cards containing data, each frame of the other group comprising a channeled bar adapted to receive the lower edge of a card and a hook projection adapted to hold the upper edge of a card, pivotal supports for one group to permit movement of the frames of that group to expose the data on the cards inserted therein, said pivotal supports being arranged in a plane extending rearwardly and upwardly to cause a stepped relation of the upper portions of the frames to expose the upper margins of the inserted cards, and links connecting the companion frames of the two groups whereby movement of the frames of one group will effect simultaneous movement of the companion frames of the other group to expose corresponding data.

In witness whereof I affix my signature.

ALBERT S. MACHEN.

Copies of this patent may be obtained for five cents each, by addressing the "Commissioner of Patents, Washington, D. C."